J. L. Rohrer.
Harvester Rake.

No. 3047. Reissued July 21. 1868.

Witnesses { Wm. B. Isley
William R. Isley

John L. Rohrer

UNITED STATES PATENT OFFICE.

JOHN L. ROHRER, OF UPPER LEACOCK TOWNSHIP, LANCASTER COUNTY, PA.

IMPROVEMENT IN HARVESTER-RAKES.

Specification forming part of Letters Patent No. 71,649, dated December 3, 1867; Reissue No. 3,047, dated July 21, 1868.

*To all whom it may concern:*

Be it known that I, JOHN L. ROHRER, of Upper Leacock township, in the county of Lancaster and State of Pennsylvania, have invented an Improvement in Harvester-Rakes; and I do hereby declare that the following is a full, clear, and exact description of the construction and operation of the same, reference being had to the accompanying drawings, making a part of this specification, in which—

Figure 1:
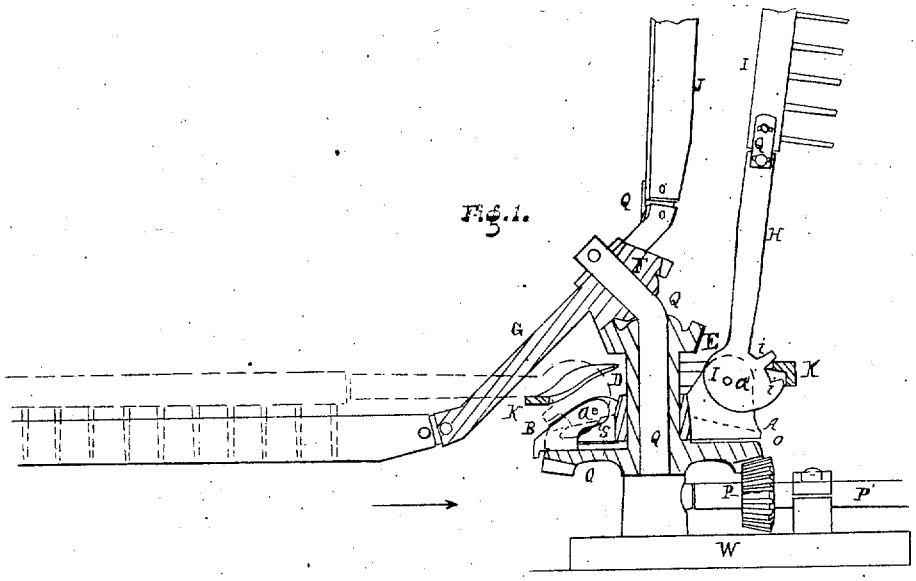
Figure 2:
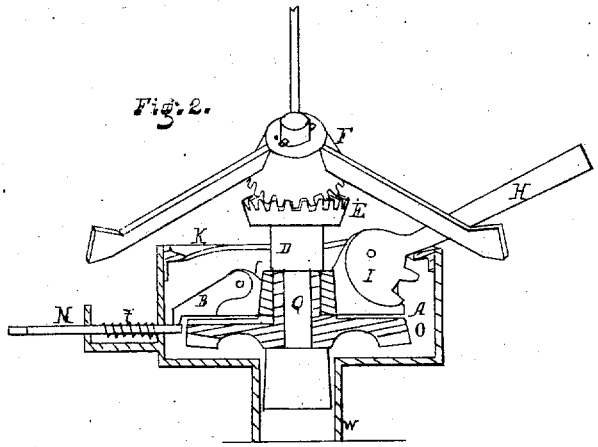
Figure 3:
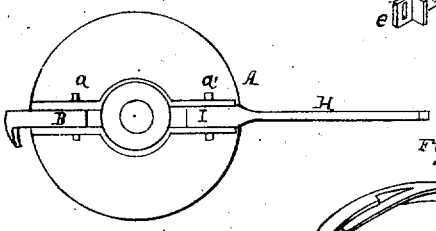
Figure 6:
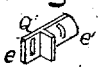
Figure 4:
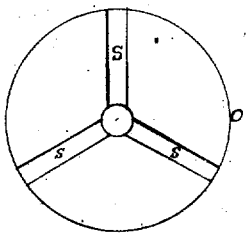
Figure 5:
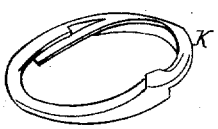

Figure 1 is a sectional elevation of my improved harvester-rake; Fig. 2, an elevation, partly in section, looking in the direction of the arrow, Fig. 1; Figs. 3, 4, 5, and 6, detached views of parts of the machine.

My improvement principally consists in so arranging the reel and rake that the operation of the latter can be arrested without arresting or interfering with the motion of the reel or gathering-arms; also, in the mode of connecting the reel-blades with the arms and rake-shaft, to which they are attached, so as to allow said blades and rake-shaft to be adjusted in two directions.

To enable others skilled in the art to make and use my invention, I will proceed to describe its construction and operation.

On a suitable foundation or bed-plate, W, are secured a box and bearings for the shaft P′ of a bevel-pinion, P, driven by chain-connections or otherwise by the wheel of the reaper. This pinion P meshes into and imparts motion to a beveled cog-wheel, O, which is provided with a collar or sleeve, forming a hollow shaft, D, on the upper end of which is a beveled pinion, E. These jointly revolve on a central fixed shaft, Q, which shaft is bent at an angle of, say, forty-five degrees above said pinion E, for the reception of a bevel-pinion, F, meshing with the pinion E in an inclined position. The pinion F is also provided with arms G, to which are connected the beaters or blades J. A washer and pin secure the pinion F to the shaft, and in the upper face of the horizontal wheel O are three or more slots, S, for the purpose described hereinafter. A disk, A, having a hub, through which passes the cylindrical sleeve D, rests upon the wheel O, and to a pin, *a*, passing through lugs on the disk, is hung a clutch, B, which may drop into a slot, S, of the cogged wheel O, and thus cause the disk A to revolve in unison with the wheel. To the disk A is also jointed an arm, H, to which is connected the rake I.

In a bracket at one side of the wheel O slides a rod, N, which is maintained at the limit of its outward motion by a spring, *t*, and is so connected to a suitable foot-lever that it can be moved toward the wheel when desired, so that as the wheel in its revolution brings the clutch B against the inner end of the shaft N the clutch will be raised out of the groove or slot S in the top of the wheel O, the motion of the disk A, with its rake attachment, being thus arrested, while the reel continues its motion as before. On drawing back the lever the clutch B drops down into the next slot S brought beneath it and locks the disk again to the wheel, when the action of the rake is resumed.

To operate the rise and fall of my rake in its revolution with the reel, I employ an annular cam, K, which consists of two inclined and two horizontal portions, each of the inclined portions occupying about sixty degrees of the circle, leaving one hundred and twenty degrees in the planes on the opposite sides, one elevated above the other.

The rake-arm H has a circular head, I′, provided with two cogs or teeth, *i i*. The operation of the cam upon the rake-arm is such that as the latter passes over the lower plane the rake I is carried from the cutter-bar to the rear of the platform, a little above the latter, in the ordinary manner. As the rake-arm is brought to the point where the camway rises upward, forming an inner inclined track for the upper tooth *i*, it is elevated, thereby bringing the rake to a vertical position. Thus elevated, it traverses the upper plane past the driver, (the tooth or cog *i* bearing on the adjacent inclined plane,) after which, as the tooth is brought on the inclined part, the rake descends to a horizontal position and operates as before.

In order to allow of the adjustment of the rake and reel-arms, I introduce a connecting-plate, Q′, in which are straight and curved slots *e e′*, and which is fastened by a screw-bolt, so that the attached shaft or blade may be raised at the heel up or down, and also be inclined more or less on the end or pivot bolt, and thus be adjusted to the platform of the reaper.

Although the reel revolves upon the same shaft as the rake, one does not interfere with the motion of the other. None of the parts is in the way of the driver. The grain is gathered in a superior manner, while the driver can arrest the motion of the rake where the grain is thin, to collect a full-sized sheaf, by simply moving inward the spring-rod N.

I claim as my invention and desire to secure by Letters Patent—

1. A series of reel-blades revolving round an inclined axis, in combination with a rake revolving simultaneously with the blades, but round a vertical axis, and which is elevated and depressed during its revolution, substantially as and for the purpose described.

2. A series of reel-blades revolving round an inclined axis, in combination with a rake revolving round a vertical axis, and with the within-described devices or their equivalents, whereby the motion of the rake may be arrested without interfering with that of the blades.

3. A shaft, Q, bent as described, and carrying revolving sleeves D F, a rake being jointed to the sleeve on the vertical portion of the shaft, and a series of arms being connected to the sleeve on the inclined portion of the shaft, substantially as and for the purpose specified.

4. The plate Q′, with its straight and curved slots, in combination with the arms and rake shafts or blades, as described.

In testimony whereof I have signed my name to this specification before two subscribing witnesses.

JOHN L. ROHRER.

Witnesses:
WM. B. WILEY,
WILLIAM F. WILEY.